US006497568B1

(12) United States Patent
Aasted (10) Patent No.: US 6,497,568 B1
(45) Date of Patent: Dec. 24, 2002

(54) APPARATUS FOR THE PRODUCTION OF SHELLS OF FAT-CONTAINING CHOCOLATE-LIKE MASSES UNDER PRESSURE BUILD-UP

(75) Inventor: Lars Aasted, Charlottenlund (DK)

(73) Assignee: Aasted-Mikroverk APS (DK)

( * ) Notice: Subject to any disclaimer, the term of this patent is extended or adjusted under 35 U.S.C. 154(b) by 0 days.

(21) Appl. No.: 09/429,971

(22) Filed: Oct. 29, 1999

(30) Foreign Application Priority Data

Nov. 2, 1998 (EP) .............................. 98203693

(51) Int. Cl.$^7$ .............................. A23G 7/00; A23P 1/00
(52) U.S. Cl. ...................... 425/547; 425/422; 425/443; 426/514; 426/515
(58) Field of Search ................................ 426/512, 514, 426/515, 660, 138; 425/547, 422, 443

(56) References Cited

U.S. PATENT DOCUMENTS

| 1,472,229 | A | | 10/1923 | Plempel | |
|---|---|---|---|---|---|
| 4,426,402 | A | * | 1/1984 | Kaupert | ....................... 426/515 |
| 5,558,895 | A | * | 9/1996 | Boyhan | ....................... 426/515 |
| 5,693,355 | A | * | 12/1997 | Haas | ........................... 426/512 |
| 5,705,217 | A | * | 1/1998 | Aasted | ........................ 426/515 |

FOREIGN PATENT DOCUMENTS

| DE | 122020 | 2/1900 |
|---|---|---|
| DE | 197 20 844 C1 | 8/1998 |
| EP | 0 589 820 A1 | 3/1994 |
| EP | 0 589 820 B1 | 3/1994 |
| WO | WO 95/32633 | 12/1995 |
| WO | WO 97/49296 | 12/1997 |

* cited by examiner

Primary Examiner—George C. Yeung
(74) Attorney, Agent, or Firm—Fish & Richardson P.C.

(57) ABSTRACT

Systems and methods for producing chocolate shells by immersing a core into a liquid filled mold cavity. The temperature of the core member is controlled. A mold cavity closure with shell rim molding surfaces extends peripherally around the core member and, together with outer surfaces of the core and inner surfaces of the mold cavity, the molding surfaces determine the full geometry of the chocolate shell. The cavity closure is axially movable in relation to the core member and has unobstructed travel in relation to the core member, when the mold cavity closure is engaged with the mold. The device includes a load for pressing the core member in direction against the mold cavity to achieve pressure build up in the mass.

27 Claims, 8 Drawing Sheets

APPARATUS FOR THE PRODUCTION OF SHELLS OF FAT-CONTAINING CHOCOLATE-LIKE MASSES UNDER PRESSURE BUILD-UP

The present invention concerns a method for the production of fat-containing, chocolate-like masses, in particular for chocolate articles, by which an amount of liquid mass is deposited into a mould cavity, whereafter an associated core member is immersed into the mass, the temperature of which core member is being controlled.

Methods of the above mentioned types as well as associated apparatus are to-day well-known within the prior art, and are being used extensively by the chocolate making industry.

EP 0 589 820 A1 (AASTED-MIKROVERK APS) describes the first commercially available method and associated apparatus of the introductory type for industrial use. It relates to a method, where the chocolate-like mass under crystallisation solidifies from the mould cavity and inwardly to form the outer shape of the shell, the temperature of the mould cavity being lower than the temperature of the tempered mass, that a cooling member having a temperature lower than 0° C. is immersed into the mass and kept in the mass in a fully immersed position for a predetermined period of time. The cooling member is furthermore immersed immediately into the mass after this has been filled into the mould cavity. The associated apparatus furthermore comprises means of controlling the up- and down movement of the cooling members, as well as controlling residence times in the fully immersed position. However, by this early teaching within the technical field of the present invention the chocolate-mass is filled into the mould cavity in an amount, which is typically about 10% larger than the volume of the finished chocolate-shell. The early EP-publication teaches no means for enclosing the mould cavity at the rim of the shell, and consequently the mass rises pressureless above the upper surface of the mould plate, when a cooling member is being immersed to the fully immersed position. The teaching describes no means for enclosing the mould cavity fully, nor for building up pressure in the chocolate-mass during moulding.

Generally within the present field, chocolate-like masses are suspensions of non-fat particles, such as sugar, milk powders and cocoa solids in a liquid fat phase. The fat phase in most cases comprises an extent of the genuin cocoa butter of until around 30%, but may comprise substitutes as well. Such substitutes may be in the form of other types of fat-containing oils. Chocolate-like masses where the cocoa butter has been replaced wholly or partly by other fats, are often named commercially as compound chocolate, in which the cocoa butter has been replaced by palm-kernel oil, are corresponding oils.

In the subsequent treatment of the ready-finished shell, the shell is frequently provided with a center mass of a creamy or liquid food material, which differs from that of the shell. Thereafter the shell is closed either with other shell parts along the periphery of the shell or by means of a coating.

Furthermore it is possible to join a produced shell with other types of shells immediately after being moulded, so that the finished food article being present as a hollow body e.g. in the form of eggs or figures, such as pixies and the like.

Furthermore it should be mentioned, that manufactured shells do not have to consist of just one layer of material but may e.g. consist of several layers of chocolate-like material. For example one shell made of dark chocolate may be provided with an interior coating of white chocolate (or vice versa) by the same method and system even before the shell moulded first leaves the mould cavity.

The chocolate-like masses are deposited into the mould cavity in a tempered liquid state. For several decades the technique of providing tempered chocolate-like masses has been well-known to the persons skilled within the art of chocolate-making. Chocolate-like mass being heated to 40–50° C. enters the process of tempering in which the mass in cooled down to around 27–32° C., whereby crystallisation is initiated. Thereafter, the chocolate-like mass is re-heated, normally not more than 2° C. providing the ready-tempered chocolate-like mass with a content of stable β crystals in an amount lesser than 5%. Thereby lower melting crystals are remelted, so that only stable crystals remain in the ready-tempered mass. Such a process is for example performed by the AMK-tempering machines provided by Aasted-Mikroverk ApS, Denmark.

The quality of the ready-moulded chocolate shells has always been determined firstly by the state of the tempered chocolate mass. The skilled person knew that good flavour and mouth feeling chocolate, high gloss, high resistance to fat bloom as well as enhanced resistance to warm or heat was the consequence of the optimum tempering state, in which the liquid chocolate comprises only stable β crystals, especially small crystals before being deposited into the mould. However, before the invention of EP 0 589 820 B1 (AASTED-MIKROVERK APS), the skilled person thought that the setting of the deposited chocolate in the mould should be gentle and time consuming to an extent of often ½–1 hour before the moulded shell could be released from the mould cavity. By the invention of EP 0 589 820 B1 this prejudice was turned upside down, thereby discovering a method by which the deposited tempered chocolate was set rapidly e.g. typically within 10 seconds providing tremendous fast production rates for chocolate making industry.

WO 95/32633 (MSTED-MIKROVERK APS) describes a method and a system of the introductory art, by which an engagement ring is mounted peripherally around the cooling member by a press-fit or by threaded engagement. The engagement ring comprises at least one peripherally extending recess defining the moulded shell rim. By depositing larger amounts of tempered chocolate-like mass into the mould cavity than the closed shell volume being available when the cooling member is immersed into the lower position, liquid mass will escape at the upper surface of the mould cavity element before the ring engages that surface. Consequently, the upper surface of the mould cavity element will be contaminated with chocolate. Furthermore it is not possible to build up any pressure in the mass during moulding. The teaching furthermore discloses, that the engagement ring may be mounted axially spring-loaded by means of a rubber insert, so that when complete filling of the shell reception volume is desired, the axial travel of the engagement ring will compensate for inaccuracies in the dosing of predetermined amount of chocolate-like mass.

However, for this teaching the actual height of the moulded shell in question will depend upon the specific amount of chocolate being deposited for moulding that article in question. Consequently the heights of the article could not be constant and will vary from article to article depending upon variations in mass amount being deposited from article to article. Furthermore no recognition is given for providing pressure build-up during moulding of the article.

DE 122 020 (RIECKE) discloses a method for the production of shells of chocolate-like masses by which an amount of liquid mass is deposited into a mould cavity, whereafter an associated core member is immersed into the mass. A ring element closes the mould cavity upwardly and constitutes a guidance for the core member. By the disclosure, the core member comprises upper peripherally extending and protruding engagement parts, which in the immersed position of the core member engage the upper surface of the ring element. By reaching that lower immersed position the liquid chocolate will consequently be squeezed out through slots between the tool parts, and in fact no pressure build-up in the mass is possible nor could be be controlled, when the core member has reached the lower position, where it stops. Furthermore the disclosure does not give any hint to a temperature control of the core member. Therefore by the DE teaching it is not possible to compensate for varying amounts of deposited mass and at the same time keeping the height of each moulded article constant, as well as being able to control pressure build-up in the mass.

By the method of the present invention, the temperature of the core member is being controlled, a mould cavity closure means, extending peripherally around the core member is further being moved unto closure engagement with the mould, which closure means is axially movable in relation to the core member, whereafter the core member is being immersed even further into the mass to achieve complete filling of the enclosed mould cavity with mass in a fully immersed position, thereby building up pressure in the mass by pressing the core member in direction against the mould cavity.

By the closure engagement of the mould cavity closure means with the mould it is secured that every moulded article has exactly the same height. Furthermore the core member is free to take in every possibly position whatever the deposited amount of chocolate-like mass may be. If the deposited amount of chocolate mass is smaller than intended, the core member will simply travel slightly further down towards the mould cavity, until complete filling of the enclosed mould cavity is obtained, the only consequence being that especially the bottom part of the article will be slightly thinner than intended. If, on the other hand, a larger amount of chocolate-like mass is deposited into the mould cavity, the travel of the core member towards the mould cavity will be lesser, so that especially the bottom part of the article will be slightly thicker than intended. By the unobstructed travel of the core member it is possible to secure pressure build-up in each article moulded, yet with the same constant height and at the same time obtaining complete filling of the mould cavity with mass.

Hereby unforeseen uniform appearance as well as homogeneous mass consistence is obtained. The density of the moulded mass material is furthermore much more uniform as by prior methods, whatever the part or geometry of the article may be. In other words every article produced has an optimal quality and properties as desired. Consequently, the waste percentage is vanishing.

The invention furthermore concerns a system for performing a method in which the system furthermore comprises the arrangement of load means adapted to press the core member in direction against the mould member to achieve pressure build-up in the mass.

According to the invention, the core member may advantageously be pressed in direction against the mould cavity with a pressure force of a predetermined value. By moulding each article with the same predetermined value one may be confident, that the quality and properties of each moulded article is as close as possible to what is desired.

The pressure force transmitted to the mass being moulded may extend to as high as $100 \times 10^5$ $N/m^2$. It has been obtained, that by raising the pressure force enhance gloss, as well as improved hardness and resistance to fat bloom is obtained for the articles. Generally without taking the type of mass into account.

The invention will be explained more fully below with reference to particularly preferred embodiments as well as the drawing, in which.

Figure 1:
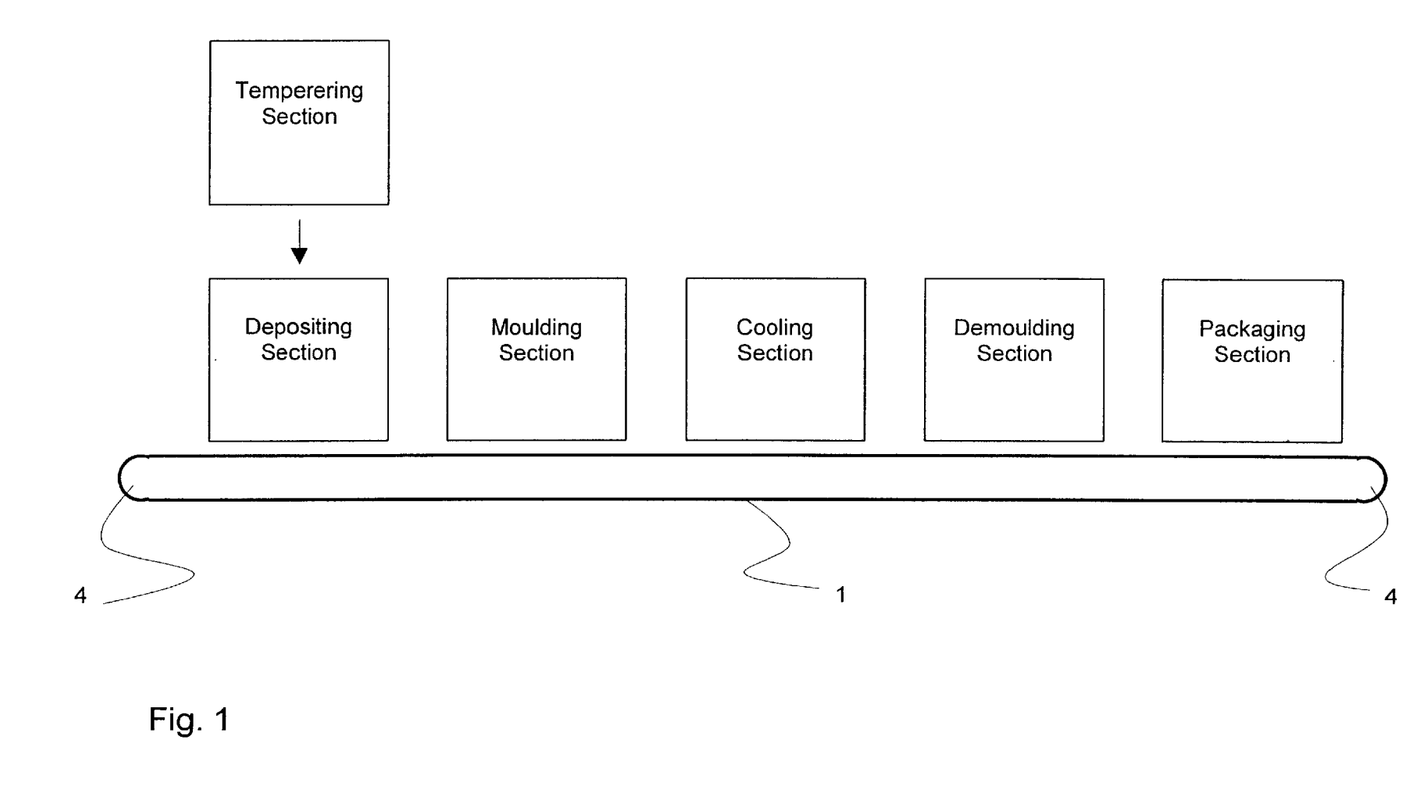
FIG. 1 is a schematical view of the steps performed for reaching a packed shell product.

Steps to be performed for reaching a packed shell product is schematically disclosed in FIG. 1.

Between two turning points 4 an endless carrier belt 1 normally carries mould elements 2 through the depositing section, the moulding section, the cooling section, the demoulding section and finally to the packaging section. Thereafter, the endless carrier belt 1 returns the mould elements 2 to the depositing section. The moulding elements 2 may comprise one or even several mould cavities 3, as depicted in FIGS. 2 and 3.

Figure 2:
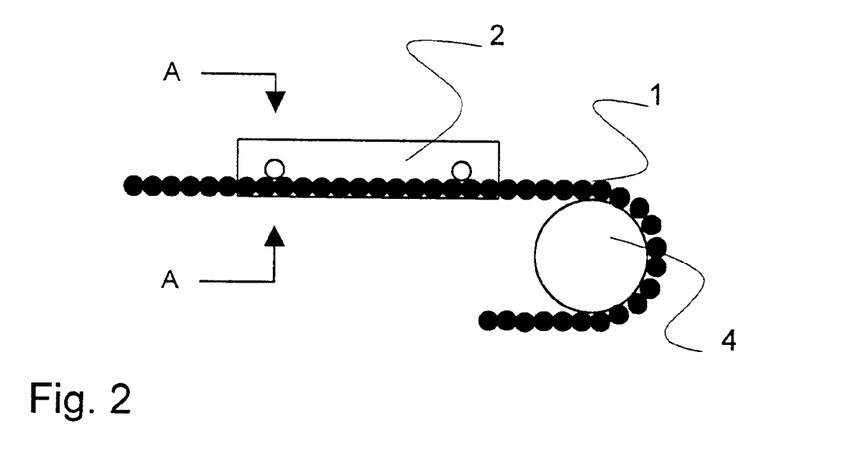
FIG. 2 is a schematical view of a turning point of an endless carrier for the mould elements, carried through the steps of FIG. 1.
Figure 3:
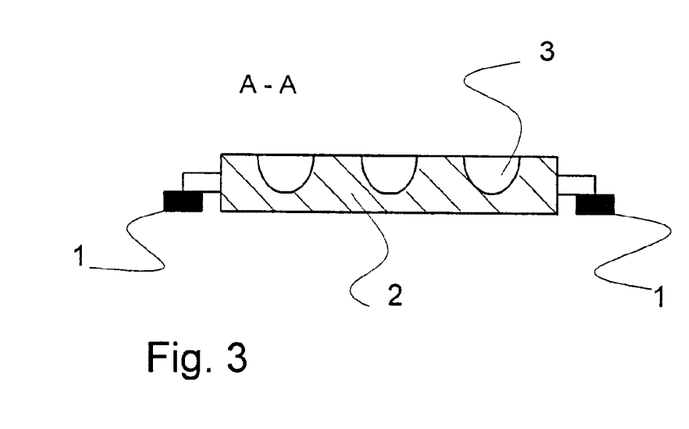
FIG. 3 is a sectional view along A—A of the mould element of FIG. 2.

Furthermore, it should be mentioned, that the FIGS. 1–3 disclose, that mould elements are moved continuously through the specific sections, such as the moulding section. In the moulding section, the moulding elements may be kept stationary when the associated core members are immersed, or the core members may be moved synchronously with the mould elements within the moulding section. Means for achieving such movements are well known to the skilled person within the art of chocolate making.

As described in EP 0 589 820 B1 (MSTED-MIKROVER APS) such systems comprise means for controlling the up and down movement of the core members as well as means for controlling the residence times of the core members in the fully immersed position, by the present invention especially to a predetermined time period. Furthermore, by the present invention, the residence times are typically lower than 60 seconds, though the invention is not restricted to such limitation. The residence times are more preferably lower than 20 seconds and are found to be especially expedient when between 0, 1 and 5 seconds.

In the tempering section the fat-containing, chocolate-like mass is normally tempered to a temperature of around 27–34° C. having a content of stable β crystals. However, the actual temperatures as well as contents of stable β crystals depend on the choice of the skilled person for the chocolate-like mass in question. The tempered chocolate-like mass is delivered to the depositing section, in which the liquid mass is deposited into the mould cavity 3. In the moulding section to follow, a core member is immersed into the mass and the shell is actually moulded. Thereafter, a cooling section may follow, as well as a section for demoulding the shell from the mould, and finally a packaging section, in which the shells are packed for delivery. The method and the systems of the present invention are subject of the moulding section.

It should be mentioned, that in the remaining drawings of this description, it is disclosed that the tempered mass 5 already has been deposited into the mould cavities 3, 3', 3".

Figure 4:
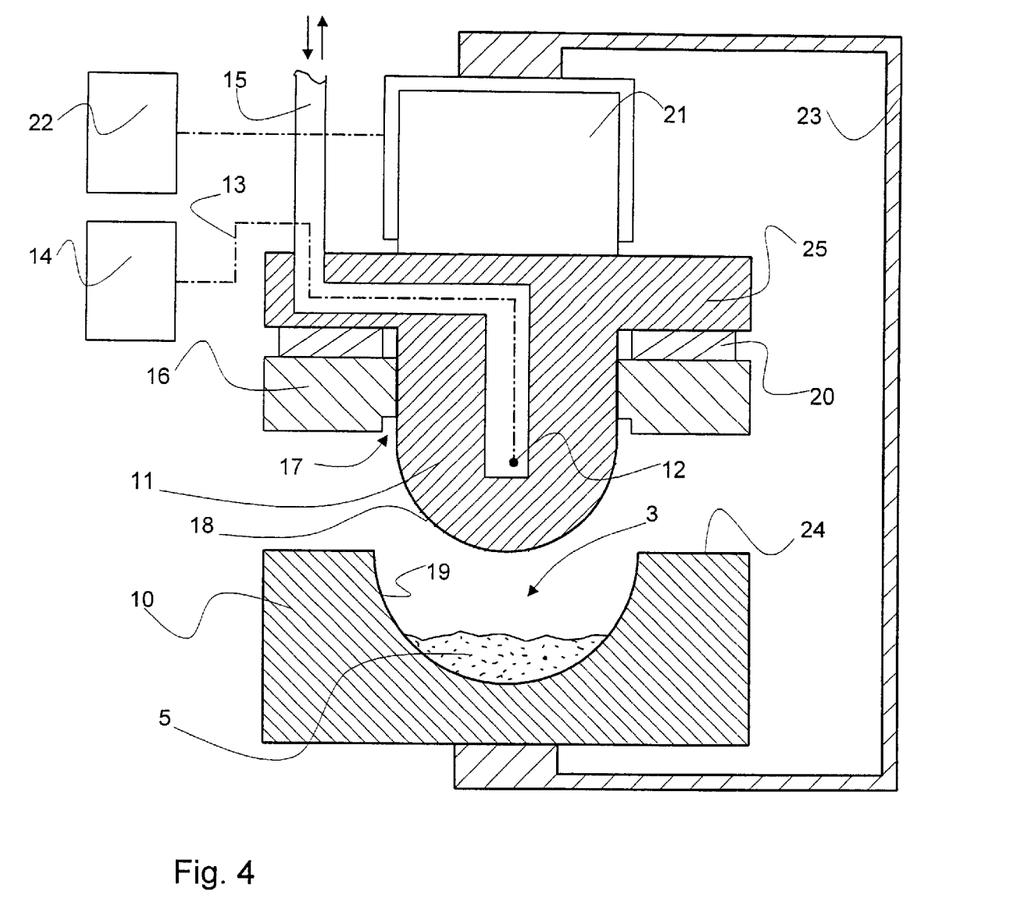
FIG. 4 is a lateral schematical cross-sectional view through a core member and an underlying mould cavity in which liquid chocolate-mass is deposited.

The first embodiment according to the invention is disclosed in FIG. 4. The system comprises at least one mould cavity 3 to receive the mass 5, as well as at least one associated core member 11 to be immersed into the mass 5. For clarity only one set of a mould cavity and a core member is disclosed, but it should be mentioned, that the inventive idea may apply for several sets of mould cavities and core members as well.

Means is arranged to control the temperature of the core member 11. This means could comprise well known temperature regulation devices such as a temperature measuring sensor 12 connected via a wire 13 to a control unit 14, which controls the regulation flow of a media, which circulates via channels 15 into the core member 11. However, these temperature regulation devices may be laid out in many different ways, such as comprising refrigeration or electrical heating, as long as they to the skilled person achieves an essentially constant temperature of the core member 11. The temperature of the core member could be controlled to be equal to or lower than 0° C., but could even be controlled to be higher than 0° C. An especially good quality of the shells as well as fast and efficient production has been achieved, when the temperature of the core member 11 is controlled to be lower than around 10° C. Especially excellent results have been obtained, when the temperature of the core member is being controlled to be lower than –5° C.

Even the temperature of the mould cavity 10 may be controlled, especially to between 10° C. and 30° C. Thereby it has astonishingly been discovered, that a smooth outer surface of the shells is obtained without having any shrinks or depressions, such as the so called "Saturn" rings.

Figure 5A:
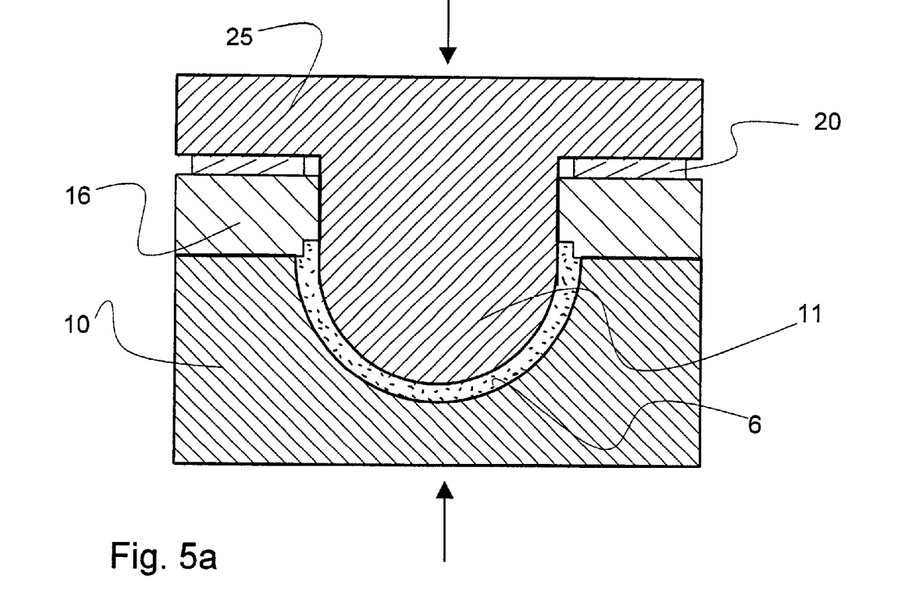
FIGS. 5a, b is schematical views of the same in a closed position with the core member fully immersed in the mass and slightly retracted from the moulded shell.

The system furthermore comprises mould cavity closure means, which could be in the form of a ring 16 as depicted in FIG. 4. The ring 16 extends peripherally around the core member 11 and comprises shell rim moulding surfaces 17, which together with outer surfaces 18 of the core 11 and inner surfaces 19 of the mould cavity 3, determines the full geometry of the ready moulded shell 6 as depicted in FIG. 5.

The cavity closure ring 16 is axially movable in relation to the core member 11. Important is, that the cavity closure ring 16 could be moved until secure closure with the mould cavity 3 when the core member 11 is moved into the mass and pressure is build-up in the mass 5. In this regard, the ring 16 may be suspended from the upper part of the core member 11 by means of one or several springs 20, or another type of compressible means.

According to the invention load means 21, 22 are arranged to press the core member 11 in direction against the mould cavity 3 to achieve pressure build-up in the mass. Load means may comprise a hydraulic cylinder 21, the actual load may be controlled by well known control means 22, by which it is possible to adjust the load force of the hydraulic cylinder to a predetermined value.

For clarity, a stiff frame or support 23 is disclosed, creating the necessary support of the counter pressure, when the core member 11 is immersed into the mass 5 and pressure is build-up. However, many other types of support may be arranged, as long as the hydraulic cylinder 21 as well as the mould element 10 has a proper support, when pressure is build-up in the mass.

Having controlled the temperature of the core member 11 to the predetermined value, such as for example –5° C., the core member 11 is moved downwards into the mass 5. During that movement, the mould cavity closure ring 16 engages the upper surface 24 of the mould element 10. As the ring 16 is suspended to the top part 15 of the core member 11 by a spring means 20, further downwards movement of the core 11 creates a biasing force in that spring means 20, pressing the ring 16 to a safe closure of the mould cavity 3 when the core moves further downwards.

By even further extension of the hydraulic cylinder 21, the core member 11 moves even further downwards into the mass to achieve a complete filling of the enclosed mould cavity 3 with liquid mass, thereby instantaneously building up pressure in the mass. Advantageously the travelling of the cylinder 21 is halted when the pressure-load has reached a predetermined value to be controlled and read out at the control means 22. The fully immersed position is disclosed in FIG. 5a.

For the particular mould cavity 3 in question, the height of the moulded shells 6 will always be exactly the same due to the secure enclosure of the mould cavity 3 by the closure ring 16, which determines the upper position of the shell rim exactly.

Furthermore the core member 11 is free to take in every possibly position whatever the deposited amount of chocolate-like mass may be. If the deposited amount of chocolate mass is smaller than intended, the core member 11 will simply travel slightly further down towards the bottom of mould cavity 3, until complete filling of the enclosed mould cavity 3 is obtained, the only consequence being that especially the bottom part of the article 6 will be slightly thinner than intended. If, on the other hand, a larger amount of chocolate-like mass is deposited into the mould cavity than intended, the travel of the core member 11 towards the bottom of the mould cavity will be lesser, so that especially the bottom part of the article will be slightly thicker than intended. By the unobstructed travel of the core member 11 it is possible to secure pressure build-up in each article moulded, yet with the same constant height and at the same time obtaining complete filling of the mould cavity with mass.

Hereby unforeseen uniform appearance as well as homogeneous mass consistence is obtained. The density of the moulded mass material is furthermore much more uniform whatever the part or geometry of the article may be as by prior methods. In other words every article produced has a quality and properties desired. Consequently, the waste percentage is vanishing.

Figure 5B:
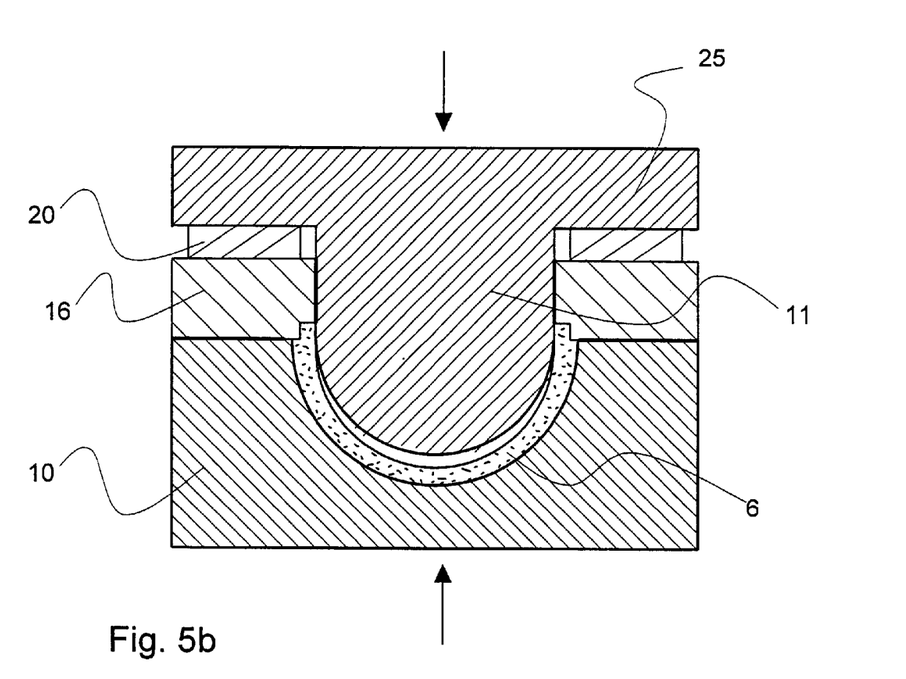

By the embodiment disclosed in FIGS. 4, 5a and 5b a is obtained, that the biasing spring means 20 forces the ring 16 against the upper surface 24 of the mould element 10, when the core member is lifted up again from the moulded shell article. Thereby the delicate rim part of the shell 6 is still safely enclosed and properly supported when the adhesion forces are released by lifting the core 11 up and free of the shell as disclosed in FIG. 5b.

Figure 6:
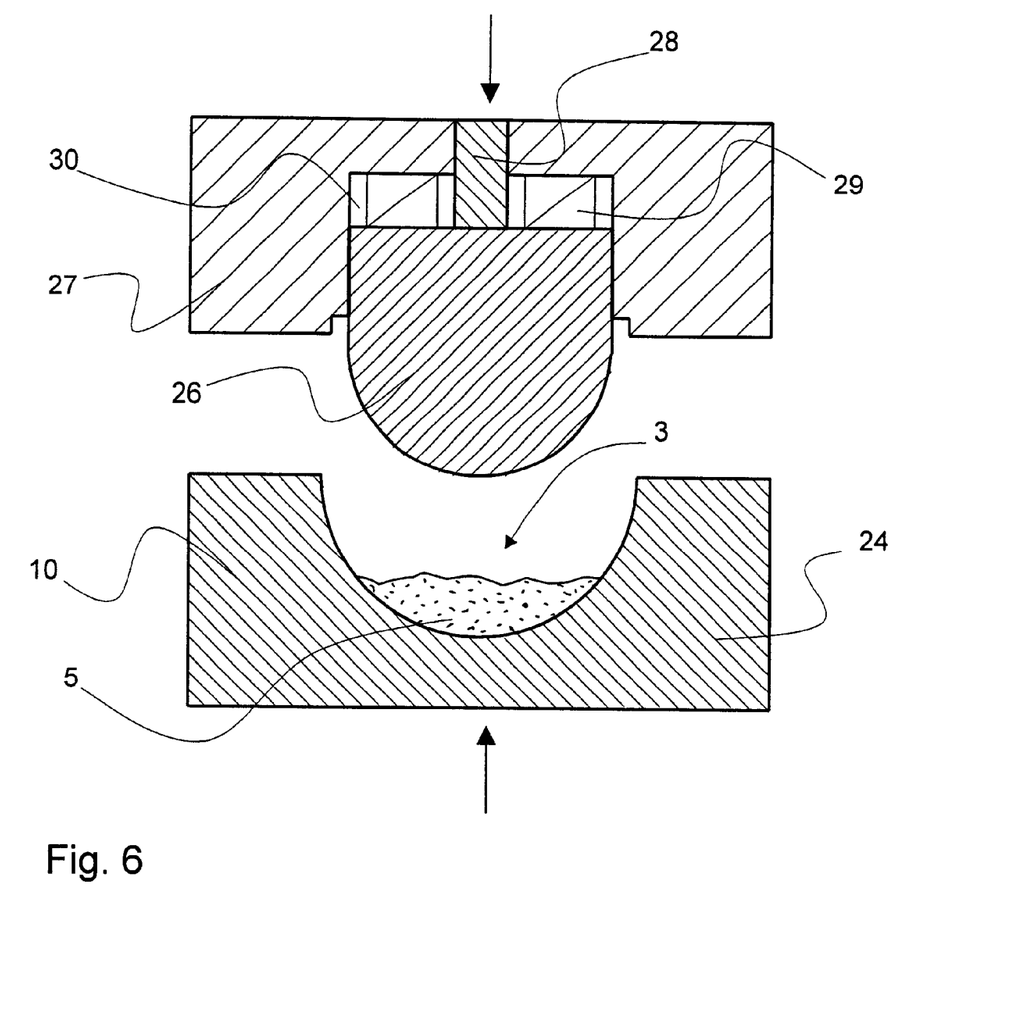
FIG. 6 is another embodiment shown as a lateral, schematical, cross-sectional view through a core member and an underlying mould cavity filled with chocolate-mass.
Figure 7:
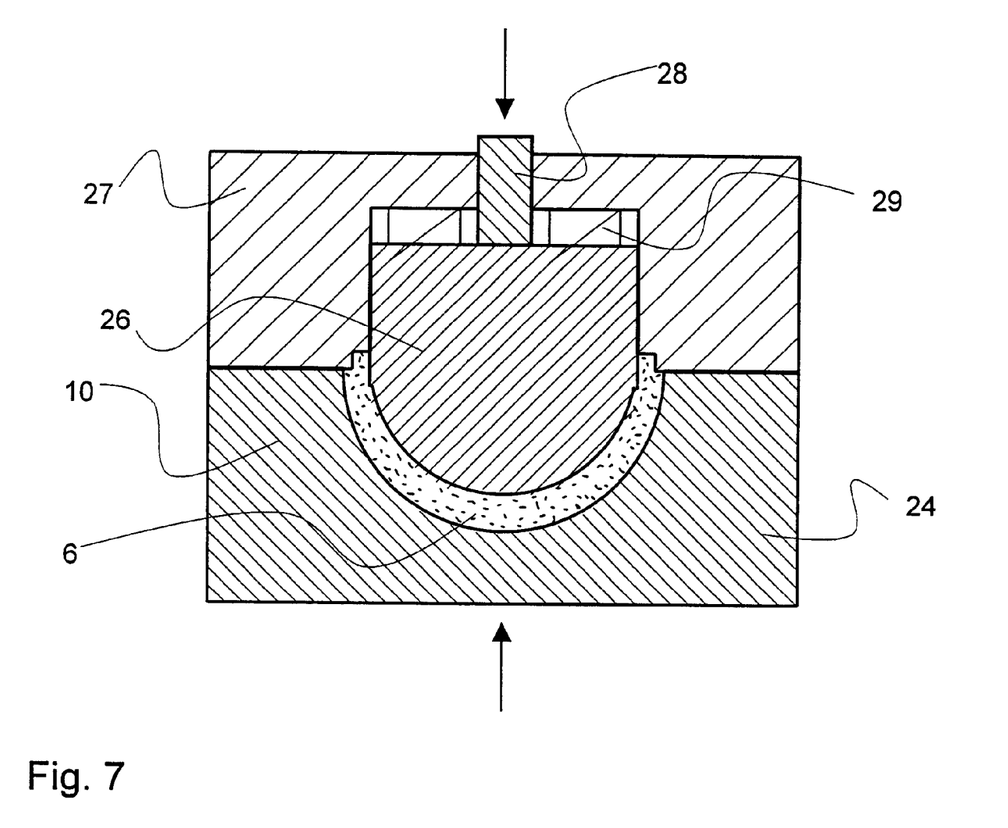
FIG. 7 is a view of the same in closed position, with the core member fully immersed into the chocolate mass.

Another embodiment of the invention is schematically disclosed in FIGS. 6 and 7. By this embodiment, the core member 26 is axially movably suspended from a holding device 27, which controls the movements of the core 26. By this embodiment the closure means constitutes part of the holding device 27. The core member 26 is guided axially in relation to the holding device 27 by means of a known type of slide guidance 28. The suspension may typically comprise compressible spring means 29 of any kind. However, a pneumatic or hydraulic pressure effected at the top surface 30 of the core member may create the appropriate suspension effect as well, either alone or in combination with the mentioned spring means 29.

It should be noted, that though not disclosed, the embodiment of FIGS. 6–9 may comprise a separate mould cavity closure ring 16 suspended from the holding device.

By moving the core member 26 down into the mass 5, the holding device 27 itself or the possibly intermediary closure ring comes to secure engagement with the upper surface 24 of the mould element 10 as disclosed in FIG. 7. By doing so, the core member 26 is immersed into the mass to achieve complete filling of the enclosed mould cavity thereby building up pressure in the mass, as the compression of the spring means 29 forces the core 26 in direction against the bottom of the mould cavity 3.

By adjusting the loadforce of the spring means 29 the actual pressureforce obtained in the mass could be essentially the same every time when a new article is moulded. This could be done, for example by changing the numbers or actual size of a row of disc-springs or the like compressible spring means. The actual pressure force obtained in at the pressurised top surface of the core member is expected to be lower than $100 \times 10^5$ N/m$^2$.

Figure 8:
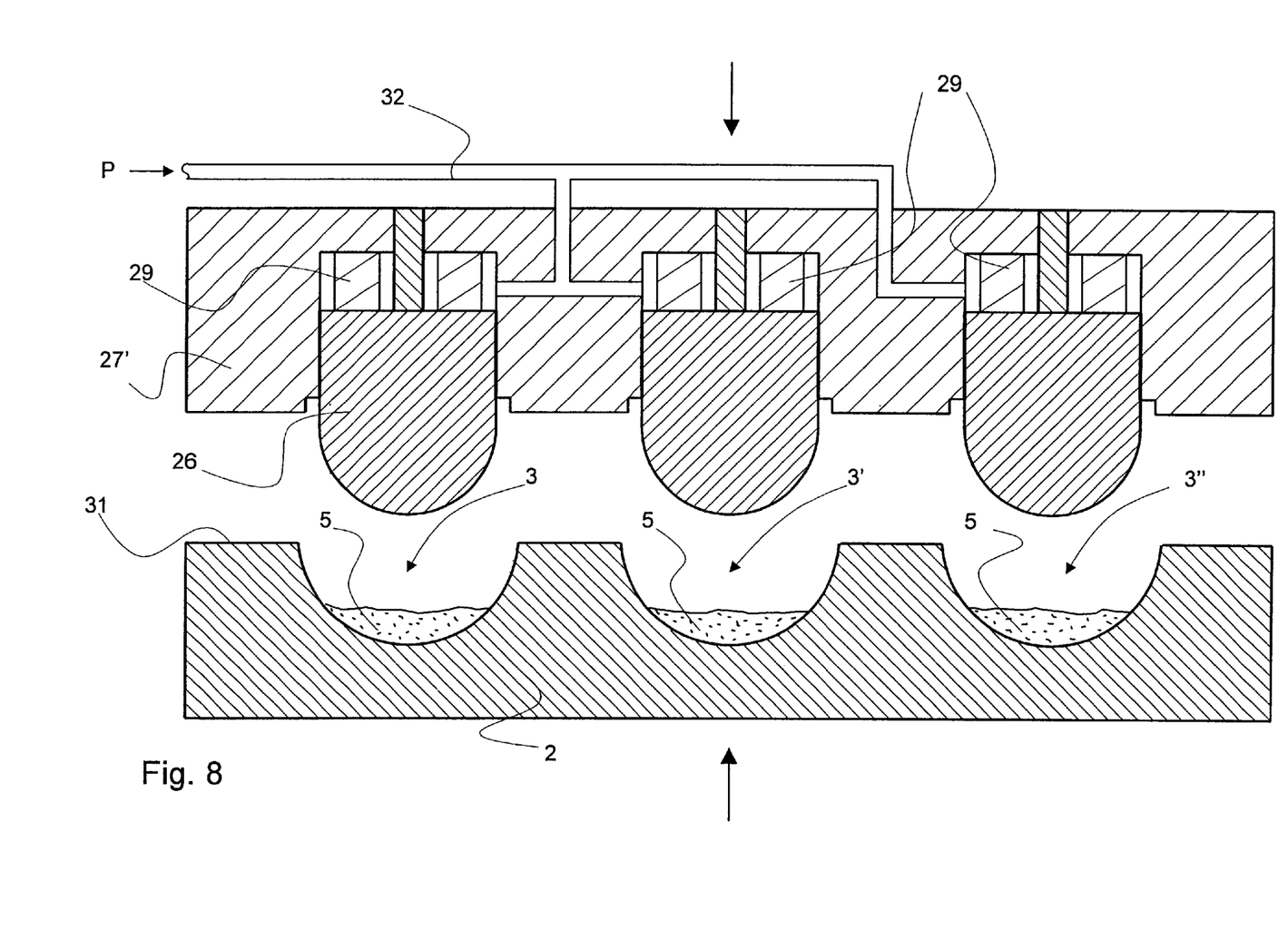
FIG. 8 is a lateral, schematical, cross-sectional view through a tool member, carrying several core members and an underlying mould cavity, such as the type depicted in FIG. 3, which is now filled with liquid mass.
Figure 9:
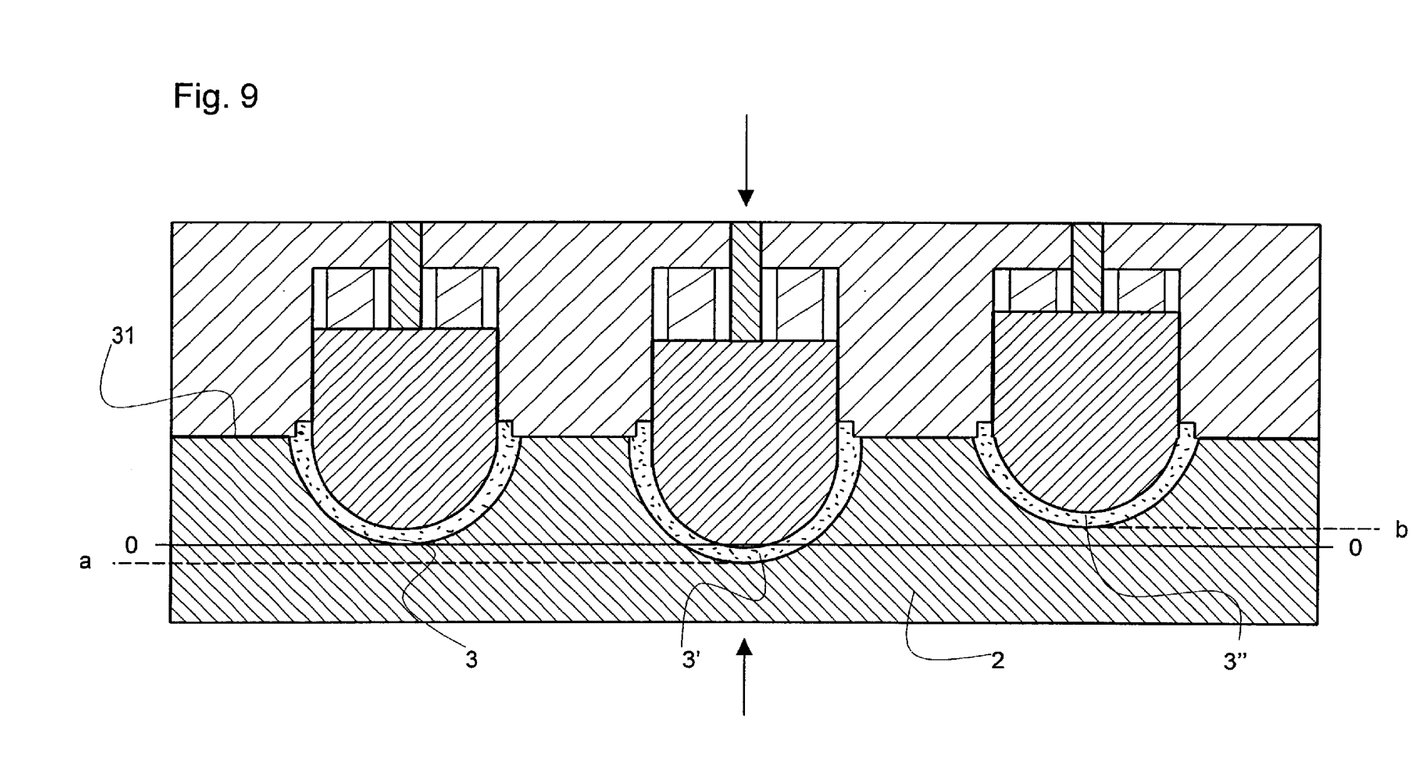
FIG. 9 is a view of the same in a closed position.

By the embodiment of FIGS. 8 and 9 the system comprise more than one core member 26. By the disclosed example the system comprise three core members 26 guided by the same device, and three underlying mould cavities 3, 3', 3" in a mould element 2. However, the specific numbers of mould cavities and associated core members are unlimited within this aspect of the invention.

Important is, that the holding device 27' comprises more than one core member, by which at least two are independently suspended from the holding device. Thereby is obtained the unexpected advantage, that essentially the same predetermined pressureforce may be obtained in every mould cavity 3, 3" 3" whatever the actual depth of the specific cavity may be under the upper surface 31 of the mould element 2. By achieving this, one is sure, that the deposited amount of mass in every cavity 3, 3', 3" of the mould element completely fills out the specific mould cavity when all the core members 26 are immersed at the same time as depicted in FIG. 9.

As schematically shown in FIG. 9, every mould element normally always exhibits different depths of the specific mould cavities from the top surface 31 of the mould element. The differences may typically be up until around 1 mm in deviation—plus (a) as depicted by the cavity 3' or minus (b) as depicted by the cavity 3" from the actually desired depth depicted by the cavity 3. Such inaccuracies in the mould elements are well-known.

Furthermore, the actually deposited amount of mass in each cavity becomes more or less irrelevant as each core member 26 simply automatically adapts its immersing depth in accordance herewith always obtaining, that the specific mould cavity in question becomes completely filled out with mass. In FIG. 9. it is shown, that in the closed position of the system, the core member of the cavity 3' has moved distance a further down than the core member of the first cavity 3, and that the core member of the cavity 3" has stopped a distance b before reaching the position of the core member of the first cavity 3, yet still securing total filling of each cavity. By the prior art where the core members were all fixed to the holding device the positions of the immersed core members always remained the same in relation to the mould cavities, what ever the actual depth of the cavity may be or the deposited amount of mass may be. The result was, that unacceptable variations in the appearance, the thickness as well as homogeneity occurred.

At disclosed by the channels 32, a pneumatic or hydraulic pressure may advantageously be brought to the top of each core member thereby obtaining the same pressureforce for each of the shells moulded in the mould element at the same time. The applied pneumatic pressure could for example be lower than 10 bar.

By the embodiment of FIGS. 8, 9 an especially fast and productive system for shell making is available, yet providing an unforeseen high quality of the complete batch of shells produced.

What is claimed is:

1. A system for the production of shells of fat-containing, chocolate-like masses for chocolate articles, comprising at least one mold cavity to receive the mass, at least one associated core member to be immersed into the mass, as well as means for controlling the temperature of the core member, further comprising a mold cavity closure extending peripherally around the core member and comprising shell rim molding surfaces, the cavity closure together with outer surfaces of the core and inner surfaces of the mold cavity determine the full geometry of the shell, the cavity closure further being axially movable with unobstructed travel in relation to the core member, the cavity closure further comprising load means for pressing the core member in direction against the mold cavity to achieve pressure build up in the mass.

2. The system according to claim 1, wherein the system comprises a load means controller controlling the load means to exert a pressure of a predetermined value to press the core member in direction against the mold cavity.

3. The system according to claim 1, wherein the load means comprises hydraulic means.

4. The system according to claim 1, wherein the load means comprises pneumatic means.

5. The system according to claim 1, wherein the load means comprises spring means.

6. The system according to claim 1, wherein the core member is connected to a holding device, which controls the axial movement of the core member.

7. The system according to claim 6, wherein the core member is axially movably suspended to the holding device.

8. The system according to claim 6, wherein load means comprises an actuator to actuate the pressure between the top of the core member and opposite surfaces of the holding device.

9. The system according to claim 1, further comprising means for forcing the mold cavity closure against the upper surface of the mold element.

10. The system according to claim 6, wherein the mold cavity closure is axially movable in relation to the holding device.

11. The system according to claim 5, wherein the load means comprises a spring means arranged between the closure and the holding device.

12. The system according to claim 6, wherein the cavity closure constitutes part of the holding device.

13. The system according to claim 1, wherein axial travel of the core member in relation to the closure means is restricted within two extreme positions.

14. The system according to claim 6, by which axial travel of the core member in relation to the device is restricted within two extreme positions.

15. The system according to claim 6, comprising more than one core member, by which the core members are independently suspended from the holding device.

16. The system according to claim 2 wherein the load means controller comprises means to control pressing by the load means to a pressure lower than $100 \times 10^5$ N/m².

17. The system according to claim 2 wherein the load means controller comprises means to control pressing by the load means to a pressure lower than $20 \times 10^5$ N/m².

18. The system according to claim 2 wherein the load means controller comprises means to control pressing by the load means to a pressure between $0.1 \times 10^5$ N/m² and $10 \times 10^5$ N/m².

19. The system according to claim 1, comprising a core member movement controller which keeps the core member fully immersed in the mold cavity for a predetermined period of time, whereafter the core member is lifted out of the mass.

20. The system according to claim 19, wherein the load means maintains a pressure of a predetermined value at least part of the predetermined period of time.

21. The system according to claim 1, wherein the means for controlling the temperature of the core member maintains the core member temperature higher than 0° C.

22. The system according to claim 1, wherein the means for controlling the temperature of the core member maintains the core member temperature equal to or lower than 0° C.

23. The system according to claim 1, wherein the means for controlling the temperature of the core member maintains the core member temperature between −30° C. and −5° C.

24. The system according to claim 1, in which the load means applies the pressureforce directly at the top of the core member.

25. The system according to claim 1, comprising a controller for controlling the temperature of the mold cavity.

26. The system according to claim 19, in which the controller for controlling the temperature of the mold cavity maintains the temperature of the mold lower than the temperature of the tempered mass.

27. The system according to claim 19, in which the controller for controlling the temperature of the mold cavity maintains the temperature of the mold cavity between 10° C. and 30° C.

* * * * *

UNITED STATES PATENT AND TRADEMARK OFFICE
CERTIFICATE OF CORRECTION

PATENT NO. : 6,497,568 B1 Page 1 of 1
DATED : December 24, 2002
INVENTOR(S) : Lars Aasted It is certified that error appears in the above-identified patent and that said Letters Patent is hereby corrected as shown below:

Column 2,
Line 10, delete the word "in" and replace it with -- is --.
Line 37, delete "MSTED" and replace it with -- AASTED --.

Column 3,
Line 32, delete the word "possibly" and replace it with -- possible --.

Column 4,
Line 50, delete "MSTED" and replace it with -- AASTED --.

Column 6,
Beginning at lines 55 and ending at line 56, delete the following: "a is obtained, that the".

Column 7,
Line 41, delete "3"" and replace it with -- 3' --.
Line 61, after the number "9" delete ".".

Signed and Sealed this

Ninth Day of September, 2003

JAMES E. ROGAN
*Director of the United States Patent and Trademark Office*